United States Patent Office 3,099,060
Patented July 30, 1963

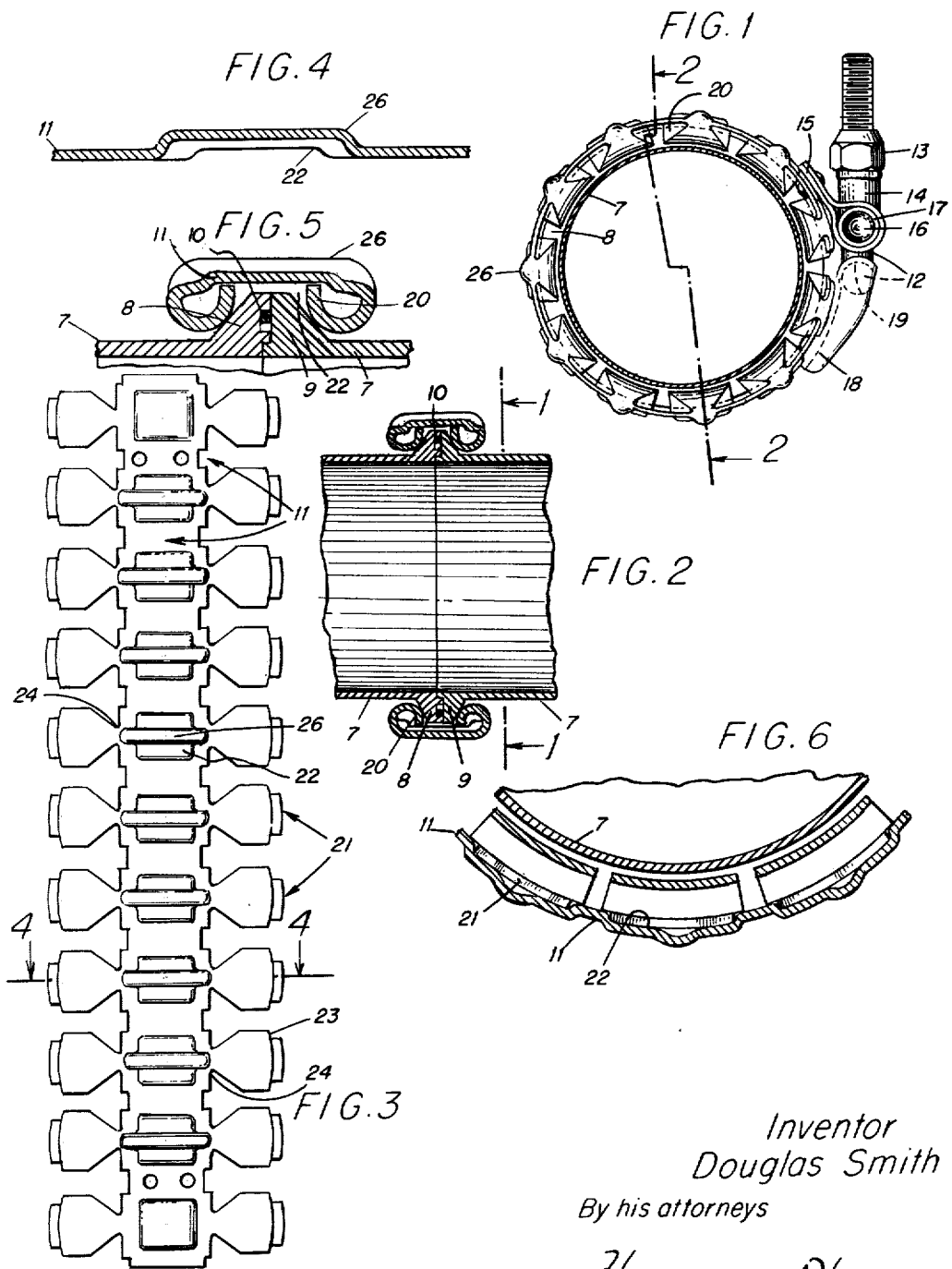

3,099,060
COUPLING FOR FLANGED PIPE ELEMENTS
Douglas Smith, 30 Highland Ave., Rowayton, Conn.
Filed Nov. 6, 1959, Ser. No. 851,435
2 Claims. (Cl. 24—279)

This invention relates to an external coupling for flanged pipe elements and more particularly to a quick coupling of the type shown in U.S. Reissue Patent 24,589 dated January 13, 1959. This type of clamp is generally used for making a tight joint for pipe ends under conditions of high pressure or varied temperature. For some uses it is desirable to reduce the weight of the equipment as much as possible. To this end it is desirable to use relatively thin tubing for the pipes and light weight couplings. In quick couplings of this general type the flanges of the pipes are held together by an external clamp having a band and lugs, the curved intermediate portion of which press the flanges together. These lugs are located at spaced points around the tubing. It has been found that occasionally high temperatures cause the ends of the pipes to soften if thin tubing is used. The pressure inside the pipe then causes the flanges to push away from each other slightly at points between the lugs. This billowing or corrugation causes a leak. The principal object of the present invention is to so construct the clamp as to avoid such leaks. It is characteristic of clamps made in accordance with this invention that the lugs are tapered in width and wider at their free ends than where they are attached to the band. The dimensions are so worked out that when the lugs are curled into position each one almost touches its neighbors, thus eliminating billowing between the lugs even when the two pipe ends and the clamp are made of very light material. Another feature of this light clamp is the ribbing of the clamp to give maximum strength to back up the tapered lugs. By this construction a stronger clamp is produced weight for weight than heretofore. It will be obvious that the new clamp can be made with bimetallic lugs as in the Reissue Patent 24,589 or with lugs of only one metal as shown in the present application.

In the drawings FIG. 1 is a view in side elevation of a clamp made in accordance with the invention fastened in position on two pipe ends taken on the line 1—1 of FIG. 2.

FIG. 2 is a view of the band of lugs of the clamp of FIG. 1 taken in cross section on the line 2—2 of FIG. 1 looking away from the means fastening the ends of the band together. The view passes through the edge of a pair of lugs at one side of the pipe ends and through the middle of a pair of lugs on the other side.

FIG. 3 is a developed view of the band and lugs of FIGS. 1 and 2 omitting the means holding two ends of the band together. In this view the lugs are shown flat before being curled under the band.

FIG. 4 is an enlarged view in cross section through the middle of a pair of lugs on the band taken on the line 4—4 of the companion view FIG. 3 before the lugs are curled under.

FIG. 5 is an enlarged view in cross section of the pair of lugs seen in the lower part of FIG. 2 and as viewed by that part of line 2—2 of FIG. 1.

FIG. 6 is a view in circumferential section through part of the band of FIG. 1 showing the free ends of the lugs in their depressions and the central strengthening ribs above them.

It is frequently desirable to keep pipe equipment as light as possible. This requirement includes both using thin pipes and reducing the weight of the clamps. This is particularly important in the case of quick clamps such as shown in the U.S. Reissue Patent 24,589 where the device may be used at high temperatures. The use of thin material in the pipes sometimes resulted in the pipe ends softening. One result was that the pressure inside the pipe caused the pipe ends to bulge away from each other between the lugs on the clamp. This corrugation of the pipe ends could cause leakage. The present invention is useful in reducing the weight of the equipment without weakening it whether there is heat enough to soften the pipe ends or not.

Referring now to the drawings, the main part of the clamp is the unitary band 11 and lugs 21. In the embodiment shown these are blanked out in one piece of metal (see FIG. 3). In the embodiment shown the pipe elements are the pipe ends designated by the reference character 7. The flanges thereon are numbered 8 and 9 respectively. The flange 8 shown on the left in FIGS. 2 and 5 contains the usual gasket or O-ring 10. The band 11 surrounding the flanges 8 and 9 has conventional means to pull its two ends together and thereby tighten it around the flanged pipe ends. Such means are shown generally in FIG. 1 as a T-headed bolt 12, a locking nut 13 and a bushing 14. As appears in FIG. 1 the upper end of the band has a strap 15 fastened thereon. There is a crosshead 16 associated with the bushing 14 and engaged by the strap 15. The crosshead is surrounded by a sleeve 17. The sleeve is engaged by the bushing 14. The T-headed bolt 12 passes through the cross head and bushing and the locking nut 13 is threaded on the bolt. On the other end of the band is fastened a socket 18 with a notch or slot 19 to enable the T-head of the bolt 12 to hook into the socket. When the nut is screwed toward the head of the bolt, the bushing 14 and nut 13 pull the two ends of the band together around the flanges on the pipe ends.

In FIG. 3 the band 11 is shown in the flat. From a comparison of FIGS. 2, 3 and 5 it will be seen that in order to encompass the flanges on the pipe ends there are a plurality of lugs 21 along each longitudinal edge of the band. When the lugs are curled up inwardly toward the middle of the band, they assume a U-shaped in cross-section as can be seen in FIGS. 2 and 5. Each lug is preferably opposite a similar lug on the opposite edge of the band. Except at the two ends where the socket 18 and the strap 15 are riveted to the ends of the band, each portion of the band opposite each pair of lugs has a central depression 22 on its inner face. When the clamp is on the pipe ends the depressions extend outwardly beyond the outer face of the band. Each depression is long enough lengthwise of the band 11, i.e. circumferentially of the clamp, to allow the free ends of the lugs to rest in them. However, the free ends of the lugs are notched at 23 to form reduced end portions (see FIG. 3) but the lugs are otherwise wider than the depression in order that the free legs of the lugs may be wide enough at a curved intermediate portion 20 where they contact the flanges to cover substantially all the length of the flanges. It will also be noted that the ends may be curved to correspond with the curve of the clamp when on the pipe elements. While the lugs are shown stamped out in a unitary manner with the band they could be made separately and fastened together. The depressions 22 in FIG. 4 should fit the notched ends 23 of the lugs and prevent their movement circumferentially with relation to the band.

At the point 24 where each lug joins the band, the lug is quite narrow (see FIG. 3), but is tapered outwardly toward the free end thereof to a width at least as great as the depression 22 and preferably greater as already mentioned. With this arrangement the length of the depression does not limit the length of the holding surface of the curried intermediate portion 20 of the lugs against the pipe flanges and the holding surfaces are therefore limited only by the requirement that they do not interfere with the holding surfaces on the neighboring lugs. In this way substantially the entire periphery of the flange of each pipe end is in direct contact with and under pressure from the lugs of the clamp, thus preventing any corrugation or bulging of the pipe. There are other advantages to this taper such as better distribution of strength and lightness.

To further this weight-saving objective a rib formation is provided which gives more rigidity than has heretofore been known. The depression 22 in the band of course provides some rigidity but this is not always sufficient. For this purpose a central rib 26 is provided across the band at each depression projecting above, i.e. upstanding from the depression 22 and extending the full width of the band. This full rib is at a point axially central of each pair of lugs. It will be seen that the upstanding central rib acts as a capstone, leaving a double stepped-back ribbed formation with the top rib of relative narrow width circumferentially of the clamp. It provides rigidity across the band being longer than and higher than the edges of the depression. However, it will be seen from FIG. 4 that the location of the central rib with relation to the edges of the depression provides complementary strength crosswise of the band, the two edges of the depression being substantially opposite the edges of the lugs at their widest point and the central rib being directly over the point of attachment of the lugs to the band. Thus cross-rigidity to strengthen the lugs is provided without reducing the ability of the band to bend around the pipe. This top rib also adds to the necessary strength at point 24 where the width is cut back.

The invention is useful in clamps whether or not they are adapted to adjust for temperature change.

What is claimed is:

1. A light weight clamp for connecting flanged pipe elements comprising a band adapted to surround two flanges and lugs along the opposite edges of the band said lugs each having an intermediate portion and having inner and outer faces, the lugs being curled radially inwardly and toward the middle of the band, the outer faces of the curled intermediate portion of the lugs being adapted to contact and press the pipe flanges together, there being a depression on the inner face of the band opposite each lug, the lugs being notched to provide free ends of reduced with substantially the same as the depressions and adapted to seat therein when curled into position against the pipe flanges, the curled intermediate portions of the lugs contacting substantially all the periphery of the flanges they being substantially wider than the ends of the lugs.

2. A clamp for flanged pipe elements according to claim 1 in which that portion of the lugs adjacent the edges of the band is substantially narrower than the curled intermediate portion of the lugs.

References Cited in the file of this patent

UNITED STATES PATENTS

| Re. 24,589 | Smith | Jan. 13, 1959 |
| 2,127,072 | Tinnerman | Aug. 16, 1938 |
| 2,208,727 | Marshall | July 23, 1940 |
| 2,271,425 | Harris | Jan. 27, 1942 |
| 2,618,998 | Poupitch | Nov. 25, 1952 |
| 2,697,570 | Snyder | Dec. 21 1954 |
| 2,814,989 | Sites | Dec. 3, 1957 |
| 2,834,087 | Herman | May 13, 1958 |
| 2,863,195 | Elms | Dec. 9, 1958 |

UNITED STATES PATENT OFFICE
CERTIFICATE OF CORRECTION

Patent No. 3,099,060　　　　　　　　　　　July 30, 1963

Douglas Smith

It is hereby certified that error appears in the above numbered patent requiring correction and that the said Letters Patent should read as corrected below.

Column 4, line 12, for "with" read -- width --.

Signed and sealed this 28th day of April 1964.

(SEAL)
Attest:

ERNEST W. SWIDER
Attesting Officer

EDWARD J. BRENNER
Commissioner of Patents